Patented July 29, 1947

2,424,853

UNITED STATES PATENT OFFICE 2,424,853

TITANIUM DIOXIDE DIELECTRIC MATERIALS

Moyer M. Safford, Schenectady, N. Y., assignor to General Electric Company, a corporation of New York No Drawing. Application May 6, 1944, Serial No. 534,537

12 Claims. (Cl. 117—106)

1

The present invention relates to improved titanium dioxide dielectric materials. It is particularly concerned with an improved titanium dioxide filler for insulating compositions and with electrically insulating compositions containing the same.

In my Patent No. 2,106,039, I described the production of a calcined titanium dioxide characterized by a high dielectric constant and a low power factor. The material was obtained by heat-treating commercial titanium dioxide at a temperature of at least about 1350 deg. C.

The present invention is based on my discovery that a further and substantial improvement in the electrical properties of calcined titanium dioxide may be obtained by treatment thereof with an organo-silicon halide, e. g. a methyl silicon halide or a mixture of such halides capable of rendering the treated material water-repellent. Examples of organo-silicon halides suitable for the purposes of the present invention are given in Patnode Patent 2,306,222 and include alkyl, e. g., methyl, aryl, e. g., phenyl, alkaryl, e. g. tolyl, and aralkyl, e. g., phenyl methyl silicon halides. I prefer to employ compositions comprising a methyl silicon halide or a mixture of methyl silicon halides, particularly compositions containing an azeotropic mixture of trimethylchlorosilane and silicon tetrachloride such as are described in the copending application of Francis J. Norton, Serial No. 476,767, filed February 22, 1943, and assigned to the same assignee as the present invention.

I have found that the treatment of calcined titanium dioxide with organo-silicon halides preferably containing an average of more than one and less than three organo groups attached to silicon produces a water-repellent dielectric material whose electrical properties are uniform, substantially independent of changing humidity conditions, and generally superior under any given conditions to those of untreated titanium dioxide. The treated material may be prepared, for example, by agitating a finely-divided calcined titanium dioxide in a closed container filled with vapors of the treating material, followed by heating of the treated material at 60 deg. to 100 deg. C. until there is no noticeable odor of hydrogen chloride given off. The amount of treating material depends upon the particular organo-silicon halide employed. With methyl silicon halides or mixtures thereof with silicon tetrachloride, I prefer to use from one to ten per cent by weight of treating material based on the weight of the titanium dioxide.

2

The following table shows the electrical properties of an untreated calcined titanium dioxide and a treated titanium dioxide obtained by treatment with a methylchlorosilane mixture consisting essentially of trimethyl chlorosilane-silicon tetrachloride azeotrope and boiling between 51 deg. and 64 deg. C. at atmospheric pressures. The electrical tests were made by molding mixtures of 70 parts of the calcined, 35-mesh titanium dioxide with 30 parts polystyrene in disks 200 mils thick and 4 inches in diameter and determining the dielectric constant, power factor and loss factor of the disks at 60 cycles as removed from the press and then after 70 hours in a 100 per cent humidity chamber.

|  | 0 hrs. | 70 hrs. |
|---|---|---|
| Untreated Sample: |  |  |
| D. C. | 15.4 | 91.0 |
| L. F. | .686 | 70.0 |
| P. F. | .045 | .61 |
| Treated Sample: |  |  |
| D. C. | 12.6 | 21.1 |
| L. F. | .117 | 1.98 |
| P. F. | .009 | .093 |

The marked increase in the dielectric constant of the untreated sample is apparently due to the high dielectric constant of the water adsorbed by the untreated titanium dioxide.

The treated titanium dioxide can be advantageously employed as all or part of the insulating or dielectric material in various electrical applications.

Dielectric sheets may be prepared by compounding the treated powder with synthetic resinous compositions such as alkyd resins, polystyrene, polythene, various synthetic rubbers, etc., and rolling or pressing the products into a thin sheet. Mixtures of polystyrene and the treated titanium dioxide are particularly useful where a high dielectric constant, low loss material is required. Such compositions which are both moldable and machinable may be made, for example, by mixing a benzene solution of polystyrene with finely-divided treated titanium dioxide and drying and molding the product. The titanium dioxide preferably comprises from 40 to 90 per cent by weight of the mixture. The dielectric constant of these mixtures increases with increase in the titanium dioxide content. The sheeted products are particularly useful as condenser dielectrics.

The treated titanium dioxide can also be used to advantage as a filler for various conductor insulating compositions where high dielectric constant and low power factor are required. The following compound is an example of cable insulating compound possessing such a combination of properties.

| | Per cent |
|---|---|
| Polybutene | 20 |
| Cyclized rubber | 13.6 |
| Zinc stearate | 0.9 |
| Treated titanium dioxide | 65.0 |

The titanium dioxide used in this formula was prepared by firing a commercial powder at 1360 deg. C., grinding the product to 100 to 200 mesh, and treating the ground material with a mixture of methyl silicon chlorides. A cable insulated with this compound was flexible and had a dielectric constant of 8.2 and a power factor of 0.0006 at 46.4 megacycles. No change in the electrical loss characteristics of the insulating material was noted when the compound was subjected to 100 per cent humidity conditions for 50 hours.

Higher loadings than 65 per cent can be made in this type of compound by slight modification of the compound ratios. Furthermore the dielectric constant is not directly proportional to the per cent loading beyond 50 per cent, but is more nearly logarithmic, so that for very little more loading a considerable increase in dielectric constant is noted. Thus it is possible to construct cable compounds having a wide range of dielectric constants.

Dielectric sheets for condenser and other uses comprising the treated titanium dioxide may also be prepared by incorporating the treated powder into paper at the time the paper is being made. Papers comprising titanium dioxide and other fillers treated with organo-silicon halides are more fully described and claimed in my copending application S. N. 534,538, filed concurrently herewith and assigned to the same assignee as the present invention.

What I claim as new and desire to secure by Letters Patent of the United States is:

1. Finely divided titanium dioxide which has been calcined at a temperature of at least about 1350° C., treated with vapors of a methyl silicon chloride mixture and thereafter heated at a temperature of from 60° to 100° C.

2. A dielectric material comprising titanium dioxide which has been calcined at a temperature of at least about 1350° C., treated with vapors of an organo-silicon halide capable of rendering the titanium dioxide water-repellent and thereafter heated at a temperature of from 60° to 100° C.

3. A dielectric material comprising titanium dioxide which has been calcined at a temperature of at least about 1350° C. and made water-repellent by contacting the calcined material with vapors of a methyl silicon chloride mixture having an average of at least one and less than three methyl groups attached to silicon atoms and thereafter heating the resultant product at a temperature of from 60 to 100° C.

4. A dielectric material comprising titanium dioxide which has been calcined at a temperature of at least about 1350° C., treated with a mixture of at least two different methyl silicon chlorides and thereafter heated to a temperature of from 60 to 100° C.

5. An insulating material of high dielectric constant comprising a polystyrene-bonded mass of a titanium dioxide which has been calcined at a temperature of at least about 1350° C., treated with vapors of a mixture of methyl silicon halides and thereafter heated to a temperature of from 60 to 100° C. to render said titanium dioxide water-repellent.

6. A dielectric material consisting of a resinous binder comprising polystyrene and from 40 to 90 per cent by weight of water-repellent calcined titanium dioxide produced by heating titanium dioxide at a temperature of at least about 1350° C., contacting the calcined material with a composition comprising an azeotropic mixture of trimethylchlorosilane and silicon tetrachloride and thereafter heating the product to a temperature of from 60 to 100° C.

7. The process of producing a titanium dioxide having a low power factor which comprises calcining titanium dioxide at a temperature of at least about 1350° C., treating the calcined product with vapors of organo-silicon halides containing an average of more than one and less than three organo groups attached to silicon and heating the treated product at a temperature of from 60 to 100° C.

8. The process of claim 7 wherein the organo-silicon halides are methyl silicon chlorides.

9. The method which comprises treating titanium dioxide which has been calcined at a temperature of at least about 1350° C. with vapors of an organo-silicon halide capable of rendering the titanium dioxide water-repellent, and thereafter heating the vapor-treated material at a temperature of from 60° to 100° C.

10. The method which comprises treating finely divided titanium dioxide which has been calcined at a temperature of at least about 1350° C. with vapors of a methyl silicon chloride mixture, and thereafter heating the vapor-treated material at a temperature of from 60° to 100° C.

11. An electrically insulating material comprising a polystyrene-bonded mass of titanium dioxide which has been calcined at a temperature of at least about 1350° C., treated with vapors of a methyl silicon chloride mixture having an average of at least one and less than three methyl groups attached to silicon atoms, and thereafter heated at a temperature of from 60° to 100° C.

12. A dielectric material comprising a polystyrene-bonded mass of titanium dioxide which has been calcined at a temperature of at least about 1350° C., treated with a mixture of at least two different methyl silicon chlorides, and thereafter heated at a temperature of from 60° to 100° C.

MOYER M. SAFFORD.

REFERENCES CITED

The following references are of record in the file of this patent:

UNITED STATES PATENTS

| Number | Name | Date |
|---|---|---|
| 2,279,762 | Scott et al. | Apr. 14, 1942 |
| 2,306,222 | Patnode | Dec. 22, 1942 |
| 2,106,039 | Safford | Jan. 18, 1938 |